United States Patent
Kim et al.

(10) Patent No.: US 10,608,218 B2
(45) Date of Patent: Mar. 31, 2020

(54) BATTERY MODULE AND BATTERY PACK COMPRISING SAME

(71) Applicant: LG CHEM, LTD., Seoul (KR)

(72) Inventors: Nam-In Kim, Daejeon (KR); Jae-Hyun Seo, Daejeon (KR); Young-Sop Eom, Daejeon (KR); Bo-Hyon Kim, Daejeon (KR); Hyun-Young Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 146 days.

(21) Appl. No.: 15/548,238

(22) PCT Filed: Sep. 8, 2016

(86) PCT No.: PCT/KR2016/010107
§ 371 (c)(1),
(2) Date: Aug. 2, 2017

(87) PCT Pub. No.: WO2017/061708
PCT Pub. Date: Apr. 13, 2017

(65) Prior Publication Data
US 2018/0034019 A1    Feb. 1, 2018

(30) Foreign Application Priority Data
Oct. 5, 2015 (KR) .................. 10-2015-0139884

(51) Int. Cl.
*H01M 2/10* (2006.01)
*H01M 10/04* (2006.01)
(Continued)

(52) U.S. Cl.
CPC ......... *H01M 2/1077* (2013.01); *H01M 10/04* (2013.01); *H01M 10/0481* (2013.01);
(Continued)

(58) Field of Classification Search
CPC ............ H01M 10/04; H01M 10/0481; H01M 10/613; H01M 10/615; H01M 10/6554; H01M 2/1077
See application file for complete search history.

(56) References Cited

U.S. PATENT DOCUMENTS

2011/0117409 A1  5/2011  Lee et al.
2011/0262799 A1* 10/2011  Kim ................ H01M 2/1077
                                                 429/156
(Continued)

FOREIGN PATENT DOCUMENTS

CN   103904254 A   7/2014
EP   2 083 469 A1  7/2009
(Continued)

OTHER PUBLICATIONS

International Search Report for PCT/KR2016/010107 (PCT/ISA/210) dated Dec. 20, 2016.

*Primary Examiner* — Stewart A Fraser
*Assistant Examiner* — Victoria H Lynch
(74) *Attorney, Agent, or Firm* — Birch, Stewart, Kolasch & Birch, LLP

(57) ABSTRACT

A battery module is provided. A battery module according to an embodiment of the present disclosure includes a cartridge assembly including a plurality of cartridges, each cartridge accommodating a battery cell, a casing including an opening formed therein and accommodating the cartridge assembly through the opening and surrounding the cartridge assembly, and a cover coupled to the opening of the casing, in which the cover includes a pressurizing portion pressurizing the battery cell when the battery cell swells.

8 Claims, 6 Drawing Sheets

(51) Int. Cl.
 *H01M 10/6554* (2014.01)
 *H01M 10/615* (2014.01)
 *H01M 10/613* (2014.01)

(52) U.S. Cl.
 CPC ....... *H01M 10/613* (2015.04); *H01M 10/615* (2015.04); *H01M 10/6554* (2015.04)

(56) References Cited

U.S. PATENT DOCUMENTS

| | | |
|---|---|---|
| 2012/0129041 A1 | 5/2012 | Komazawa |
| 2012/0308874 A1 | 12/2012 | Ootani et al. |
| 2013/0164594 A1 | 6/2013 | Zahn |
| 2014/0011059 A1 | 1/2014 | Hashimoto et al. |
| 2014/0370340 A1 | 12/2014 | Kimura et al. |
| 2016/0133892 A1 | 5/2016 | Uhm et al. |
| 2016/0141735 A1 | 5/2016 | Motohashi et al. |
| 2016/0226117 A1* | 8/2016 | Noh .................. H01M 10/6566 |

FOREIGN PATENT DOCUMENTS

| | | |
|---|---|---|
| EP | 2 541 668 A1 | 1/2013 |
| EP | 2 717 649 A1 | 4/2014 |
| JP | 2006-140023 A | 6/2006 |
| JP | 2012-252888 A | 12/2012 |
| JP | 2013-528306 A | 7/2013 |
| JP | 2015-118773 A | 6/2015 |
| JP | 2015-158976 A | 9/2015 |
| KR | 10-2011-0053713 A | 5/2011 |
| KR | 10-2012-0016354 A | 2/2012 |
| KR | 10-2014-0039350 A | 4/2014 |
| KR | 10-2014-0144945 A | 12/2014 |
| KR | 10-2015-0012413 A | 2/2015 |
| WO | WO 2012/133707 A1 | 10/2012 |
| WO | WO 2013/069356 A1 | 5/2013 |
| WO | WO 2014/141753 A1 | 9/2014 |
| WO | WO 2015/008563 A1 | 1/2015 |

* cited by examiner

BATTERY MODULE AND BATTERY PACK COMPRISING SAME

TECHNICAL FIELD

The present disclosure relates to a battery module and a battery pack including the same, and more particularly, to a battery module in which when a battery cell swells, the battery cell is pressurized to prevent expansion or deformation, and a battery pack including the battery module.

The present application claims priority to Korean Patent Application No. 10-2015-0139884 filed on Oct. 5, 2015 in the Republic of Korea, the disclosure of which is incorporated herein by reference.

BACKGROUND ART

Technological development and increasing demand for mobile devices have led to a rapid increase in the demand for secondary batteries as an energy source, and nickel-cadmium batteries or hydrogen-ion batteries have been used as conventional secondary batteries, but recently, lithium secondary batteries have been widely used due to their very low self-discharge rate, high energy density, and free charging/discharging since a memory effect does not substantially occur in comparison to nickel-based secondary batteries.

Such a lithium secondary battery mainly uses lithium-based oxide and a carbon material as a cathode active material and an anode active material, respectively. The lithium secondary battery includes an electrode assembly, which includes a cathode plate coated with the cathode active material, an anode plate coated with the anode active material, and a separator disposed therebetween, and an outer casing, i.e., a battery case, to accommodate with a hermetic seal, the electrode assembly therein along with an electrolyte solution.

A lithium secondary battery includes a cathode, an anode, and a separator and an electrolyte that are disposed therebetween, and is classified into a lithium-ion battery (LIB) and a polymer lithium-ion battery (PLIB) depending on materials used for a cathode active material and an anode active material. Typically, an electrode of a lithium secondary battery is formed by applying a cathode active material or an anode active material to a current collector such as an aluminum or copper sheet, a mesh, a film, foil, etc.

Meanwhile, in the lithium secondary battery, a swelling phenomenon of expansion and shrink of a secondary battery may repeatedly occur due to gas generated in charging and discharging of the secondary battery, and due to the repeated occurrence of the swelling phenomenon, deformation occurs in a battery module and a mounting portion may be damaged.

DISCLOSURE

Technical Problem

The present disclosure is designed to solve the problems of the related art, and therefore the present disclosure is directed to providing a battery module which pressurizes a battery cell to prevent expansion or deformation when the battery cell swells, and a battery pack including the battery module.

The present disclosure is also directed to providing a battery module in which a heat management member is disposed in a position lower than a connection bar to contact a cooling unit or a heating unit, thus facilitating heat transfer to a battery cell, and a battery pack including the battery module.

Technical Solution

In one aspect of the present disclosure, there is provided a battery module that includes a cartridge assembly including a plurality of cartridges, each cartridge accommodating a battery cell, a casing including an opening formed therein and accommodating the cartridge assembly through the opening and surrounding the cartridge assembly, and a cover coupled to the opening of the casing, in which the cover includes a pressurizing portion capable of pressurizing the battery cell when the battery cell swells.

The cover may include a hollow portion formed therein, and the pressurizing portion may include at least one connection bar connecting, to each other, opposite end portions of the cover including the hollow portion formed therein.

The connection bar may include a steel material.

The battery module may further include a heat management member which contacts the pressurizing portion and radiates heat of the battery cell or transfers heat to the battery cell.

The heat management member may include a first member which contacts the pressurizing portion and is spaced apart from a cooling unit or a heating unit and a second member which extends inclinedly from the first member and is disposed alongside the pressurizing portion to contact the cooling unit or the heating unit.

The second member and the pressurizing portion may be disposed to have different distances from the cooling unit or the heating unit.

The heating unit may include a heating film.

The heat management member may include a steel material.

In another aspect of the present disclosure, there are provided a battery pack including the above-described battery module and a vehicle including the battery module.

Advantageous Effects

In embodiments of the present disclosure, when a battery cell swells, a pressurizing portion provided in a cover pressurizes the battery cell, thereby preventing expansion or deformation of a battery module.

In addition, a heat management member is disposed in a position lower than a connection bar to contact a cooling unit or a heating unit, thus facilitating heat transfer to a battery cell.

BEST MODE

Figure 1:
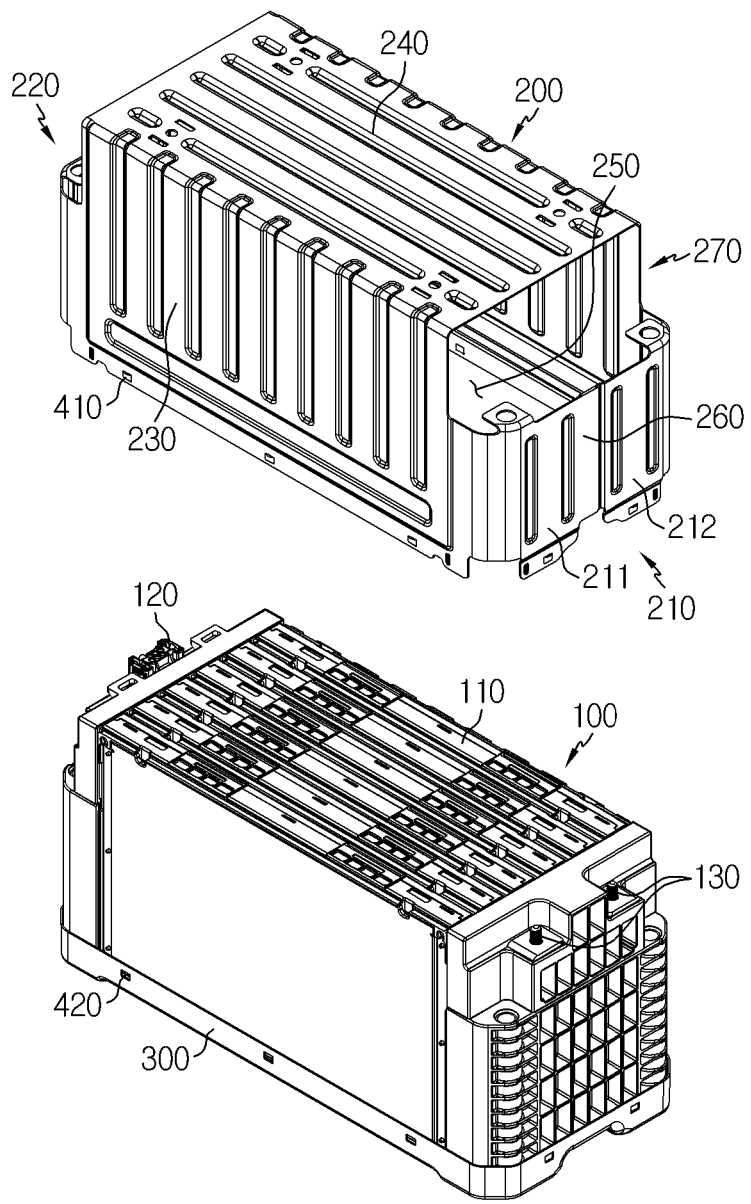
FIG. 1 is an exploded perspective view of a battery module according to an embodiment of the present disclosure.

Hereinafter, a battery module and a battery pack including the same according to an embodiment of the present disclosure will be described in detail with reference to the accompanying drawings.

The terms or words used in the description and claims below should not be interpreted as only general or dictionary meanings, but interpreted as meanings and concepts satisfying the present disclosure based on a principle in that the inventor can appropriately define his/her disclosure with a concept of the terms in order to describe the disclosure in the best method. Therefore, since embodiments described in the present specification and configurations shown in the drawings are merely exemplary embodiments of the present disclosure and do not represent all of the present disclosure, it should be understood that there may be various equivalents and modified examples that can replace the embodiments described in the present specification and the configurations shown in the drawings at the time of filling the present application.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

As used herein, the term 'couple' or 'connect' includes not only direct coupling or connection between a member and another member, but also indirect coupling or connection of a member with another member using a coupling or connecting member.

Figure 2:
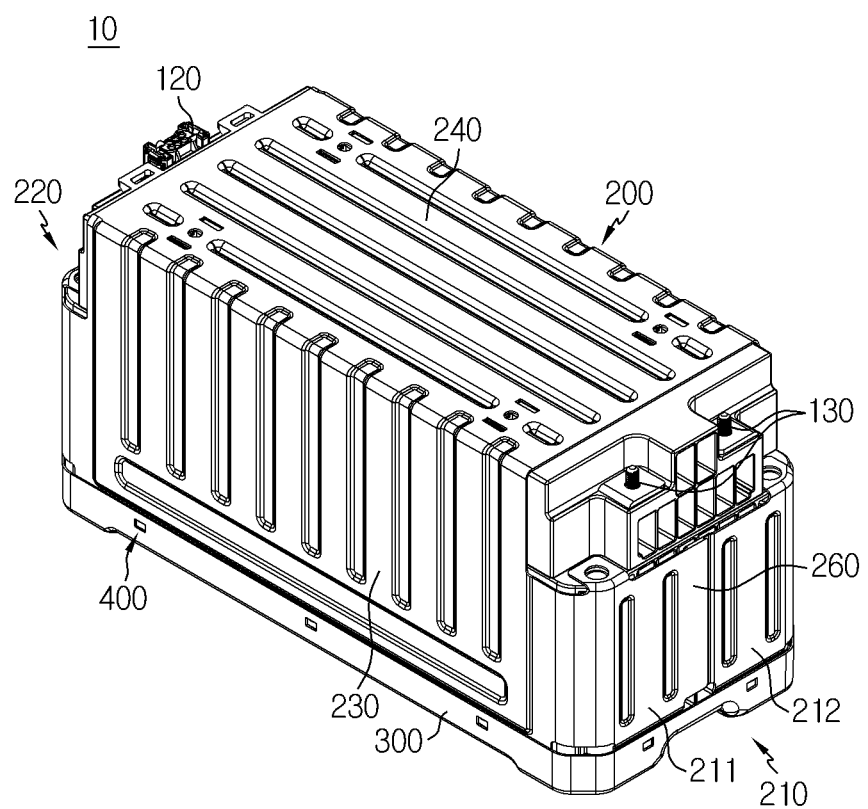
FIG. 2 is a coupled perspective view of FIG. 1.

FIG. 1 is an exploded perspective view of a battery module according to an embodiment of the present disclosure, and FIG. 2 is a coupled perspective view of FIG. 1.

Referring to FIGS. 1 and 2, a battery module 10 according to an embodiment of the present disclosure may include a cartridge assembly 100, a casing 200, and a cover 300.

Referring to FIG. 1, the cartridge assembly 100 may include a plurality of cartridges that accommodate a battery cell 110. The cartridge assembly 100 may be manufactured by injection molding of plastic, and the plurality of cartridges having an accommodation portion capable of accommodating the battery cell 110 formed therein may be stacked in the cartridge assembly 100. The cartridge assembly 100 is accommodated in a space formed by coupling between the casing 200 and the cover 300, and the battery cell 100 accommodated in a cartridge may be accommodated and protected in the space. The cartridge assembly 100 may include a connector element 120 or a terminal element 130. The connector element 120 may include various forms of an electric connection part or connection member for connection to, for example, a battery management system (BMS, not shown) capable of providing data of a voltage or a temperature of the battery cell 110. The terminal element 130 is a main terminal connected to the battery cell 110 and may include a cathode terminal and an anode terminal, and may also include a terminal bolt for electric connection with an external device.

Referring to FIGS. 1 and 2, the casing 200 surrounds the entire cartridge assembly 100 to protect the cartridge assembly 100 from external vibration or shock. The casing 200 may be formed to have a shape corresponding to a shape of the cartridge assembly 100. For example, if the cartridge assembly 100 has a hexahedral shape, the casing 200 may also have a hexahedral shape to correspond to the shape of the cartridge assembly 100. The casing 200 may be manufactured by bending a plate of, for example, a metal material, and thus the casing 200 may be integrally manufactured as one piece. When the casing 200 is manufactured to include the plate of the metal material, the casing 200 may include a front plate 210, a back plate 220, a side plate 230, and a top plate 240. When the casing 200 is integrally manufactured as one piece, i.e., when the front plate 210, the back plate 220, the side plate 230, and the top plate 240 are integrally manufactured as one piece, a coupling process may be facilitated and simplified. That is, in a conventional case, for the battery cell 110, a plurality of protection plates that are separated are coupled to one another, and when the plurality of plates are coupled by, for example, welding, each of the plurality of plates has to be welded, complicating a coupling process. Moreover, since the plurality of protection plates need to be provided, the number of parts increases. However, in the battery module 10 according to an embodiment of the present disclosure, the casing 200 is provided as one piece, such that the number of parts and the number of welding times are smaller than in a conventional art, facilitating and simplifying a coupling process. However, in an embodiment of the present disclosure, the casing 200, i.e., the front plate 210, the back plate 220, the side plate 230, and the top plate 240 are provided as separate parts and thus may be coupled by various bonding methods such as welding, etc.

The casing 200 may be provided with an opening 250 to accommodate the cartridge assembly 100. Although the opening 250 is formed in a lower portion of the casing 200 and the casing 200 is provided to accommodate and surround the cartridge assembly 100 from the top of the cartridge assembly 100 in FIG. 1, the current embodiment is not limited to this illustration such that the opening 250 may be formed in an upper portion of the casing 200 and the casing 200 may be provided to accommodate and surround the cartridge assembly 100 from the bottom of the cartridge assembly 100.

When the casing 200 is integrally provided as one piece as described above, the casing 200 may include a bonding portion 260 that is cut to bond the first front plate 211 and the second front plate 212 with each other, and the first front plate 211 and the second front plate 212 may be coupled by welding of the bonding portion 260. However, a scheme for coupling between the first front plate 211 and the second front plate 212 is not limited to welding, and various schemes such as a rivet, a bolt, a pin, a bracket, a moment connection, etc. may be applied to the bonding portion 260 to couple the first front plate 211 and the second front plate 212 with each other. Like the above-described front plate 210, the back plate 220 may be bonded by the bonding portion 260 and may be coupled by various bonding methods including welding. A detailed description of the back plate 220 will be substituted by the description of the front plate 210.

In the casing 200 may be formed a through portion 270 through which the connector element 120 or the terminal element 130 is exposed to the outside. That is, the connector element 120 or the terminal element 130 is electrically connected with an external part or member, and to prevent the casing 200 from interfering with such electric connection, the through portion 270 is formed in the casing 200. Referring to FIGS. 1 and 2, the connector element 120 or the terminal element 130 is exposed to the outside of the casing 200 through the through portion 270 formed in the casing 200 and thus may be connected with an external element. The through portion 270 may be formed to cut at least one surface of the casing 200, and in this case, the through portion 270 is formed in a region adjacent to the bonding portion 260 on a surface of the casing 200. Herein, the through portion 270 is not necessarily cut to allow the connector element 120 or the terminal element 130 to be exposed to the outside, and may be formed as a small hole through which a wire, etc., runs as long as the connector element 120 or the terminal element 130 is electrically connected with an external element.

Referring to FIGS. 1 and 2, the cover 300 is coupled to the opening 250 of the casing 200. That is, the cartridge assembly 100 is accommodated in the space formed by coupling between the casing 200 and the cover 300, and is protected from external vibration or shock.

The cover 300 is coupled to the casing 200 in various ways such as welding, a bolt, a pin, etc., and preferably, using a hook member 400 as described below.

As shown in FIG. 1, when the opening 250 is formed in the lower portion of the casing 200, the cover 300 is coupled to the opening 250 of the casing 200 in the lower portion of the casing 200. In this case, the cover 300 protects the bottom of the cartridge assembly 100. However, a coupling position of the cover 300 is not limited to this example, and although not shown, when the opening 250 is formed in the upper portion of the casing 200, the cover 300 may be coupled to the opening 250 of the casing 200 in the upper portion of the casing 200. In this case, the cover 300 protects the top of the cartridge assembly 100.

Figure 3:
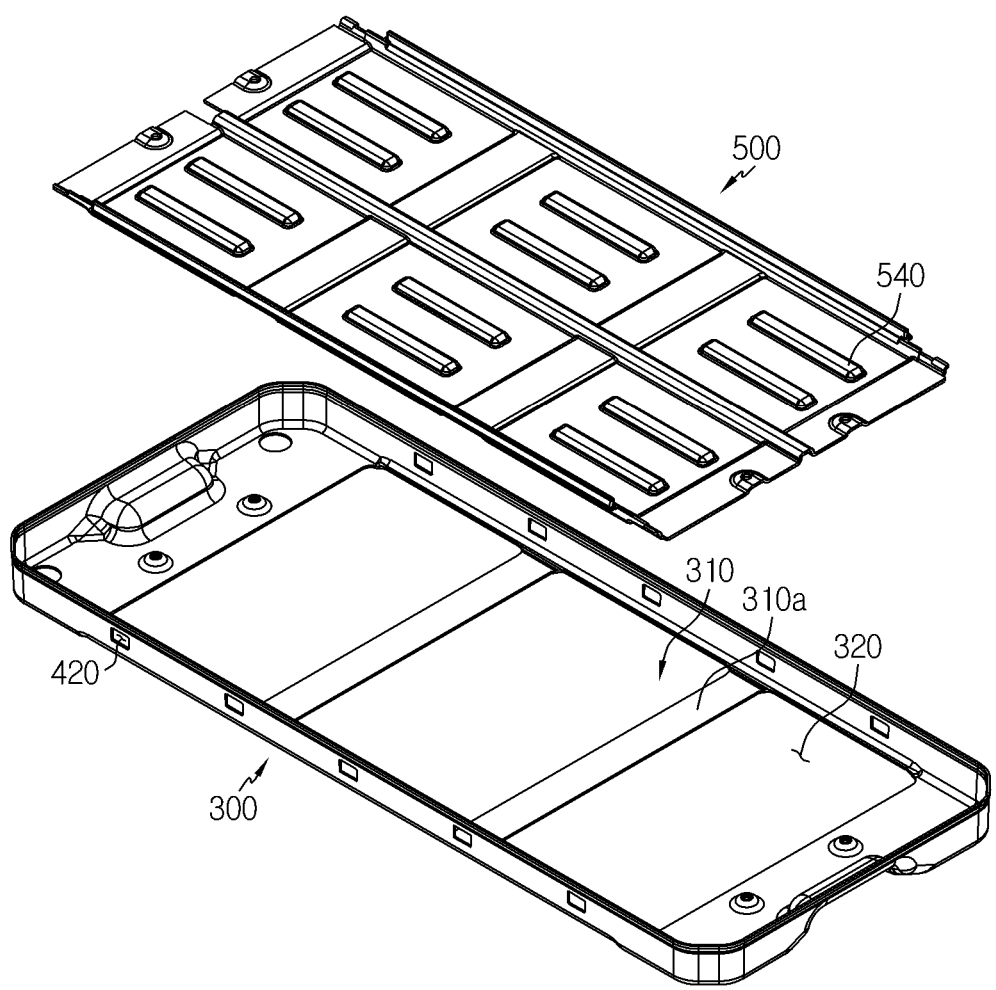
FIG. 3 is an exploded perspective view of a cover and a heat management member in a battery module according to an embodiment of the present disclosure.
Figure 4:
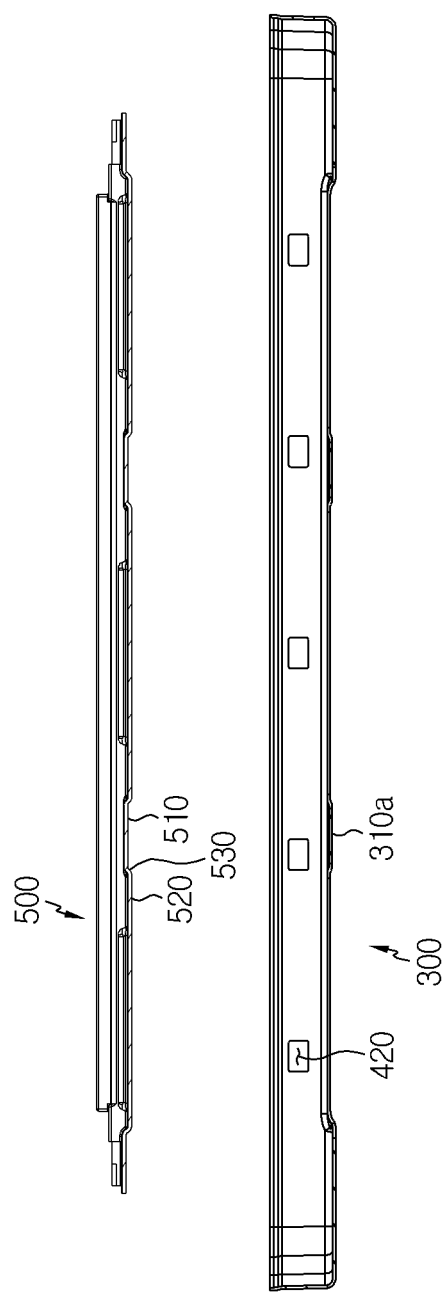
FIG. 4 is an exploded side cross-sectional view of a cover and a heat management member in a battery module according to an embodiment of the present disclosure.
Figure 5:
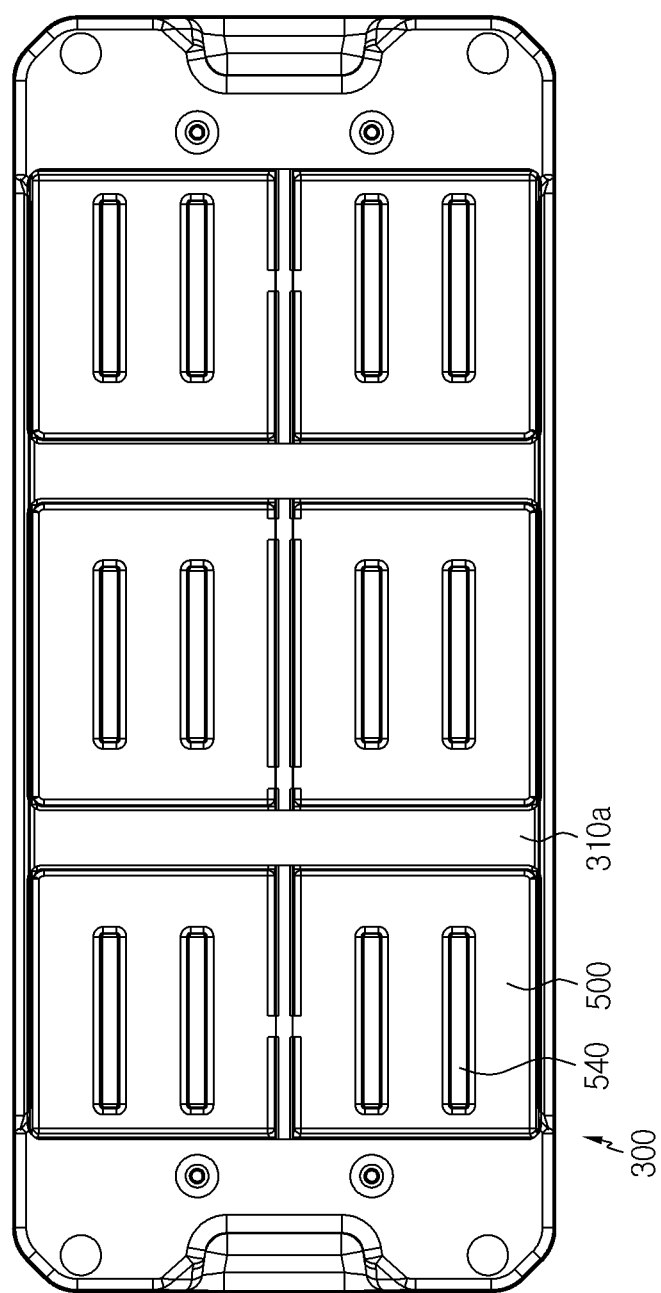
FIG. 5 is a bottom view showing that a heat management member is coupled to a cover in a battery module according to an embodiment of the present disclosure.
Figure 6:
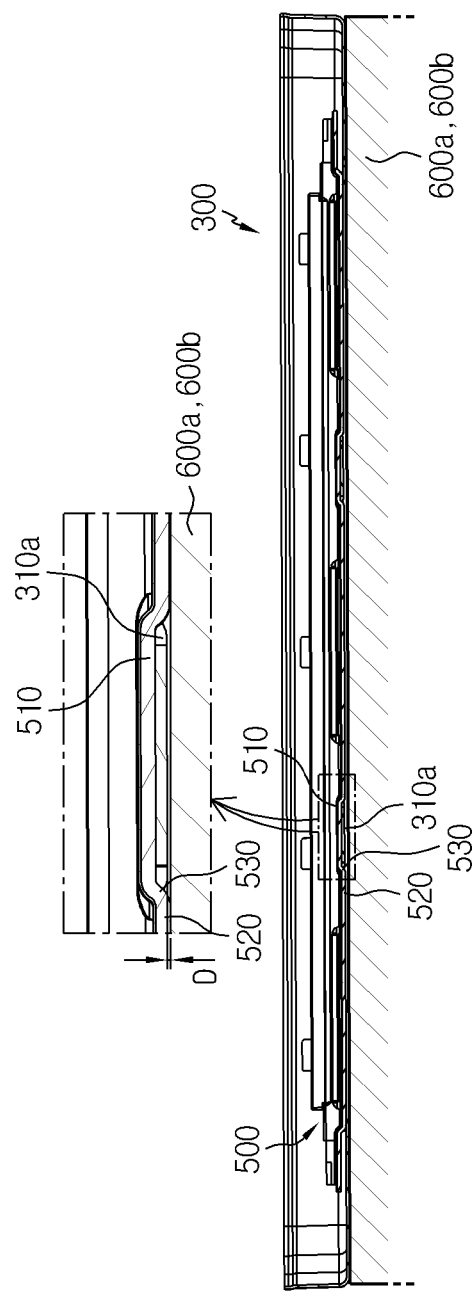
FIG. 6 is a side cross-sectional view and a partial enlarged view showing that a heat management member is coupled to a cover in a battery module according to an embodiment of the present disclosure.

FIG. 3 is an exploded perspective view of a cover and a heat management member in a battery module according to an embodiment of the present disclosure, FIG. 4 is an exploded side cross-sectional view of a cover and a heat management member in a battery module according to an embodiment of the present disclosure, FIG. 5 is a bottom view showing that a heat management member is coupled to a cover in a battery module according to an embodiment of the present disclosure, and FIG. 6 is a side cross-sectional view and a partial enlarged view showing that a heat management member is coupled to a cover in a battery module according to an embodiment of the present disclosure.

Referring to FIGS. 3 through 6, a pressurizing portion 310 is formed on the cover 300 to pressurize the battery cell 110 when the battery cell 110 swells. If the battery cell 110 is repeatedly charged and discharged during a long-time use thereof, the battery cell 110 swells in which the battery cell 110 expands and contracts due to gas generated therein. Herein, unless the pressurizing portion 310 is formed on the cover 300, the cover 300 may be deformed or a mounting portion of the battery module 10 may be damaged due to the expansion of the battery cell 110, and for example, if a plurality of battery modules 10 are arranged in parallel with one another, the cover 300 expands together with the expansion of the battery cell 110, pressurizing and thus deforming the cover 300 of another battery module 10 located adjacent to the battery module 10 having the expanding battery cell 110. To prevent this problem, the pressurizing portion 310 is formed on the cover 300 to pressurize the battery cell 110 when the battery cell 110 swells. That is, the swelling may be minimized by the pressurizing portion 310 formed on the cover 300. Referring to FIG. 3, in the cover 300 may be formed a hollow portion 320 to which a heat management member 500 to be described later is coupled to radiate heat of the battery cell 110 or to transfer heat to the battery cell 110. Herein, the pressurizing portion 310 may also be coupled to the exterior of the cover 300 to pressurize the cover 300, and may be provided with one or more connection bars 310a connecting, to each other, opposite end portions of the cover 300 in which the hollow portion 320 is formed. Hereinbelow, for convenience, the following description will be made of a case where the pressurizing portion 310 is provided with the connection bar 310a.

The connection bar 310a may be of a straight-line type formed integrally with the cover 300. However, an embodiment of the present disclosure is not limited to this example, and the connection bar 310a may be of a separable type detachably coupled to the cover 300 or may include a curved-line or curved-surface shape.

The connection bar 310a includes a steel material for securing stiffness to sufficiently pressurize the battery cell 110 when the battery cell 110 swells. The cover 300 and the connection bar 310a may be integrally manufactured as one piece, and in this case, the cover 300, like the connection bar 310a, may also be manufactured using a steel material. However, the connection bar 310a does not necessarily include a steel material, and may include various materials as long as those materials may sufficiently pressurize the battery cell 110 when the battery cell 110 swells. The connection bar 310a contacts the heat management member 500 to support the heat management member 500.

Referring to FIGS. 3 through 6, to radiate heat of the battery cell 110, the heat management member 500 may include a cooling plate contacting a radiation pin of a cartridge in which the battery cell 110 is accommodated. To transfer heat to the battery cell 110, the heat management member 500 may include a heating plate contacting a heating pin of a cartridge in which the battery cell 110 is accommodated. However, in an embodiment of the present disclosure, the heat management member 500 is not limited to the cooling plate or the heating plate, and may include various elements for radiating heat of the battery cell 110 or transferring heat to the battery cell 110. The heat management member 500 may be formed of an aluminum material to smoothly transfer heat. However, the heat management member 500 does not necessarily include an aluminum material, and may include various materials if those materials allow smooth heat transfer for the battery cell 110.

The heat management member 500 is coupled to and contacts the pressurizing portion 310 on the pressurizing portion 310. However, a contact position of the heat management member 500 and the pressurizing portion 310 is merely an example, and thus the heat management member 500 may contact the pressurizing portion 310 in various positions such as under the pressurizing portion 310. The heat management member 500 may include a plate of a metal material, on which an uneven portion 540 may be formed to improve heat radiation efficiency by increasing a heat contact area (see FIGS. 3 and 5). The heat management member 500 may include a first member 510 and a second member 520 connected thereto. Hereinafter, the first member 510 and the second member 520 will be described.

Referring to FIG. 6, the first member 510 contacts the connection bar 310a, for example, on the connection bar 310a. That is, when the first member 510 is placed on the connection bar 310a, the entire heat management member 500 may be supported by the connection bar 310a. Also, when the first member 510 is placed on the connection bar 310a, a cooling unit 600a or a heating unit 600b is disposed under the connection bar 310a, and the first member 510 is spaced apart from the cooling unit 600a or the heating unit 600b. Herein, when the heat management member 500 includes a cooling plate, the cooling unit 600a of various types may be disposed below the first member 510; when the heat management member 500 includes a heating plate, the heating unit 600b of various types may be disposed below the first member 510. The cooling unit 600a may include, for example, a cooling fan, a heat radiation pin, a connection plate, etc., and the heating unit 600b may include a heating film. Herein, the heat management member 500 of the battery module 10 according to an embodiment of the present disclosure may generally include a cooling plate coupled to the cooling unit 600a to radiate heat of the battery cell 110, but in a region having a low average temperature, e.g., a polar region, etc., heat needs to be provided to the battery cell 110 for smooth operation of the battery cell 110, and in this case, the heat management member 500 of the battery module 10 according to an embodiment of the present disclosure may include a heating plate coupled to the heating unit 600b, e.g., a heating film.

The second member 520 extends with a slope 530 from the first member 510. For example, when the first member 510 contacts the connection bar 310a on the connection bar 310a, the second member 520 is inclined downwardly from the first member 510 (see the enlarged view of FIG. 6). After the second member 520 is inclined downwardly from the first member 510, the second member 520 is arranged alongside the connection bar 310a to contact the cooling unit 600a or the heating unit 600b under the connection bar 310a. That is, if the heat management member 500 includes a cooling plate and the cooling unit 600a is disposed under the connection bar 310a, the cooling plate may include the first member 510 and the second member 520, and heat generated in the battery cell 110 is radiated to the outside through the second member 520 contacting the cooling unit 600a. Like in case of the cooling plate, if the heat management member 500 includes a heating plate and the heating unit 600b is disposed under the connection bar 310a, the heating plate may include the first member 510 and the second member 520, and heat provided by the heating unit 600b is transferred to the battery cell 110 through the second member 520 contacting the heating unit 600b.

The second member 520 and the connection bar 310a may be disposed to have different distances from the cooling unit 600a or the heating unit 600b, and in this case, the second member 520 may contact the cooling unit 600a or the heating unit 600b, whereas the connection bar 310a may be spaced apart from the cooling unit 600a or the heating unit 600b, making a distance D between the connection bar 310a and the cooling unit 600a or the heating unit 600b. That is, the cooling unit 600a or the heating unit 600b contacts only the second member 520, such that heat may be transferred only through the second member 520. For example, if the first member 510 is placed on the connection bar 310a, the second member 520 is inclined downwardly from the first member 510, and the cooling unit 600a or the heating unit 600b is disposed below the connection bar 310a, the connection bar 310a may be disposed at a higher position than the second member 520 from the cooling unit 600a or the heating unit 600b.

Referring to FIGS. 1 and 2, the casing 200 and the cover 300 may be selectively coupled or decoupled by a hook member 400. The casing 200 and the cover 300 may be coupled by bolting or welding; when the casing 200 and the cover 300 are coupled by bolting, a space for insertion of a bolt has to be secured, wasting a more space than needed, and when the casing 200 and the cover 300 are coupled by welding, the casing 200 and the cover 300 are extremely difficult to separate if an abnormal phenomenon like cell swelling, etc. occurs in the battery module 10. However, when the casing 200 and the cover 300 are coupled using the hook member 400, the coupling is easy to perform, no space is wasted because a work space needed in bolting is not required, and the casing 200 and the cover 300 may be easily separated from each other and be processed when an abnormal phenomenon occurs in the battery module 10. However, an embodiment of the present disclosure does not exclude coupling between the casing 200 and the cover 300 using bolting or welding, and the casing 200 and the cover 300 may be coupled in various manners including bolting and welding as necessary.

The hook member 400 may include a hook protrusion 410 and an engagement hole 420 with which the hook protrusion 410 is engaged. Referring to FIG. 1, one or more hook protrusions 410 may be provided in the casing 200, and the engagement hole 420 may be provided in the cover 300 to correspond to the number and positions of hook protrusions 410.

Although not shown, the one or more hook protrusions 410 may also be provided in the cover 300, and the engagement hole 420 may be provided in the casing 200 to correspond to the number and position of hook protrusions 410.

Hereinafter, operations of the battery module 10 according to an embodiment of the present disclosure will be described.

Referring to FIG. 3, the one or more connection bars 310a are coupled to the cover 300 to pressurize the battery cell 110 when the battery cell 110 swells. That is, when the battery cell 110 expands due to its charging and discharging, the connection bar 310a is connected to the cover 300 to pressurize the expanding battery cell 110, thereby minimizing swelling and preventing expansion or deformation of the battery module 10.

The heat management member 500 including the cooling plate and the heating plate may be placed, for example, on the connection bar 310a. In this state, the first member 510 of the heat management member 500 contacts the connection bar 310a and the second member 520 extends inclinedly downward from the first member 510 to contact the cooling unit 600a or the heating unit 600b, thus radiating heat of the battery cell 110 or transferring heat to the battery cell 110. Since the heat management member 500 contacts the cooling unit 600a or the heating unit 600b in a lower position than the connection bar 310a, heat transfer for the battery cell 110 may be facilitated.

Meanwhile, a battery pack (not shown) according to an embodiment of the present disclosure may include one or more battery modules 10 according to an embodiment of the present disclosure. The battery pack (not shown) may further include a case for accommodating the battery module 10 and various devices for controlling charging/discharging of the battery module 10 such as a battery management system (BMS), a current sensor, a fuse, and so forth, in addition to the battery module 10.

A vehicle (not shown) according to an embodiment of the present disclosure may include the above-described battery module 10 or battery pack (not shown), and the battery pack (not shown) may include the battery module 10. The battery module 10 according to an embodiment of the present disclosure may be applied to the vehicle (not shown), e.g., a vehicle (not shown) provided to use electricity such as an electric vehicle, a hybrid vehicle, or the like.

Although the present disclosure has been described with reference to limited embodiments and drawings, the present disclosure is not limited thereto, and it would be obvious that various modifications and changes may be made by those of ordinary skill in the art without departing from the present disclosure and a scope equivalent to the appended claims.

INDUSTRIAL APPLICABILITY

The present disclosure relates to a battery module and a battery pack including the same, and is applicable particularly to the industry associated with secondary batteries.

What is claimed is:

1. A battery module comprising:
    a cartridge assembly comprising a plurality of cartridges, each cartridge accommodating a battery cell;
    a casing comprising an opening formed therein and accommodating the cartridge assembly through the opening and surrounding the cartridge assembly;
    a cover coupled to the opening of the casing, the cover including a pressurizing portion pressurizing the battery cell when the battery cell swells; and
    a heat management member which contacts the pressurizing portion and radiates heat of the battery cell or transfers heat to the battery cell, the heat management member including:
    a first member which contacts the pressurizing portion and is spaced apart from a cooling unit or a heating unit; and
    a second member which extends inclinedly from the first member and is disposed alongside the pressurizing portion to contact the cooling unit or the heating unit.

2. The battery module of claim 1, wherein the cover comprises a hollow portion formed therein, and the pressurizing portion comprises at least one connection bar connecting, to each other, opposite end portions of the cover comprising the hollow portion formed therein.

3. The battery module of claim 2, wherein the connection bar comprises a steel material.

4. The battery module of claim 1, wherein the second member and the pressurizing portion are disposed to have different distances from the cooling unit or the heating unit.

5. The battery module of claim 1, wherein the heating unit comprises a heating film.

6. The battery module of claim 1, wherein the heat management member comprises an aluminum material.

7. A battery pack comprising the battery module according to claim 1.

8. A vehicle comprising the battery module according to claim 1.

* * * * *